United States Patent
Berger

(10) Patent No.: US 10,466,937 B2
(45) Date of Patent: Nov. 5, 2019

(54) METHOD OF IMPLEMENTING A HIGH RELIABILITY FLASH MEMORY RECORDER

(71) Applicant: BAE SYSTEMS Information and Electronic Systems Integration Inc., Nashua, NH (US)

(72) Inventor: Richard W. Berger, Woodbridge, VA (US)

(73) Assignee: BAE Systems Information and Electronic Sustems Integration Inc., Nashua, NH (US)

( * ) Notice: Subject to any disclaimer, the term of this patent is extended or adjusted under 35 U.S.C. 154(b) by 149 days.

(21) Appl. No.: 15/823,967

(22) Filed: Nov. 28, 2017

(65) Prior Publication Data
US 2019/0163408 A1    May 30, 2019

(51) Int. Cl.
*G06F 11/00* (2006.01)
*G06F 3/06* (2006.01)
*G06F 11/20* (2006.01)
*G06F 12/127* (2016.01)

(52) U.S. Cl.
CPC .......... *G06F 3/0679* (2013.01); *G06F 3/064* (2013.01); *G06F 11/2089* (2013.01); *G06F 12/127* (2013.01); *G06F 2212/7204* (2013.01); *G06F 2212/7211* (2013.01)

(58) Field of Classification Search
CPC .. G06F 11/0724; G06F 11/0739; G06F 11/07; G06F 11/0703; G06F 11/2089; G11C 29/12; G11C 16/3495
See application file for complete search history.

(56) References Cited

U.S. PATENT DOCUMENTS

| | | | |
|---|---|---|---|
| 7,130,973 B1 * | 10/2006 | Chong, Jr. | G06F 11/1662 711/162 |
| 9,274,582 B2 * | 3/2016 | Mangione-Smith | G06F 1/3203 |
| 2007/0074011 A1 * | 3/2007 | Borkar | G06F 1/3203 712/227 |
| 2007/0180186 A1 * | 8/2007 | Cornwell | G06F 12/023 711/103 |

(Continued)

OTHER PUBLICATIONS

Guillemenet, "On the Use of Magnetic RAMs in Field-Programmable Gate Arrays", Mar. 31, 2008, Hindawi Publishing Corporation, pp. 1-10 (Year: 2008).*

(Continued)

*Primary Examiner* — Bryce P Bonzo
*Assistant Examiner* — Jeison C Arcos
(74) *Attorney, Agent, or Firm* — Davis & Bujold, PLLC

(57) ABSTRACT

The system and method of implementing a high reliability flash memory recorder comprising warm spare and error code correction bytes across several multi-chip modules. The use of redundant field programmable gate arrays and/or processors for command and control increases redundancy. The system and method has lookup table-based mechanisms combined with programming to determine when to substitute a warm spare byte as well as when to declare a block of memory as "bad" and no longer to be used. The system may use multiple memory banks with power switching per bank to reduce power consumption as well as increase reliability when the array is not being accessed.

19 Claims, 9 Drawing Sheets

(56) References Cited

U.S. PATENT DOCUMENTS

| | | | | |
|---|---|---|---|---|
| 2007/0180328 A1* | 8/2007 | Cornwell | ............. | G06F 11/073 714/42 |
| 2007/0282572 A1* | 12/2007 | Larus | ................... | G06F 9/5066 703/2 |
| 2008/0005539 A1* | 1/2008 | Velhal | .................. | G06F 11/008 712/220 |
| 2009/0043957 A1* | 2/2009 | Davis | .................... | G11C 15/00 711/108 |
| 2009/0094481 A1* | 4/2009 | Vera | ........................ | G06F 1/206 714/11 |
| 2009/0144583 A1* | 6/2009 | Bruennert | ............. | G11C 29/44 714/6.32 |
| 2010/0037001 A1* | 2/2010 | Langlois | ............ | G06F 12/0246 711/103 |
| 2010/0095088 A1* | 4/2010 | Vorbach | ............. | G06F 9/30036 712/29 |
| 2010/0153700 A1* | 6/2010 | Capps, Jr. | ............. | G06F 9/3842 713/100 |
| 2010/0281134 A1* | 11/2010 | Melen | ................ | G06F 11/0739 709/217 |
| 2014/0082453 A1* | 3/2014 | Sikdar | ................. | G11C 29/808 714/763 |
| 2014/0380019 A1* | 12/2014 | Wilkerson | ........... | G06F 9/3836 712/30 |
| 2015/0095701 A1* | 4/2015 | Hodgson | ................. | G06F 16/23 714/23 |
| 2016/0188424 A1* | 6/2016 | Walls | ................... | G06F 11/1662 714/6.3 |
| 2016/0335144 A1* | 11/2016 | Cai | ....................... | G06F 11/073 |
| 2017/0177246 A1* | 6/2017 | Miller | ................ | G06F 11/1666 |
| 2018/0285192 A1* | 10/2018 | Merl | ................... | G06F 11/1004 |

OTHER PUBLICATIONS

"Micron 32Gb, 64Gb, 128Gb, 256Gb Asynchronous/Synchronous NAND Features", Micron Technology Inc., pp. 1-166, 2010.

"NAND Flash Module 69F96G24, 69F192G24", Data Device Corporation, pp. 1-14, Rev 3, Feb. 6, 2017.

Charlie Howard, "Flash Mitigation Strategies and Tradeoffs", Military/Aerospace Programmable Logic Device Workshop 2009, pp. 1-23, Sep. 2, 2009, Greenbelt, MD.

* cited by examiner

METHOD OF IMPLEMENTING A HIGH RELIABILITY FLASH MEMORY RECORDER

FIELD OF THE DISCLOSURE

The present disclosure relates to flash memory and more particularly to a method of providing flash memory data recorders with high-reliability.

BACKGROUND OF THE DISCLOSURE

Flash memory is an electronic, solid-state, non-volatile computer storage medium that can be electrically erased and reprogrammed. Flash memory is used for easy and fast information storage in computers, digital cameras, and the like. Another use for flash memory is in data recorders, such as those used in space missions, aircraft, or the like. Generally, flash memory is known as a solid state storage device. Flash memory retains information regardless of whether the power is on or off. The present disclosure provides a method of implementing flash memory for data recorders that require high reliability.

SUMMARY OF THE DISCLOSURE

An approach for implementation of a highly reliable non-volatile storage array based upon NAND flash memory components is disclosed. It combines two concepts for increased reliability, employing both error correction and some element of redundancy. In doing so, the amount of overhead required is reduced vs. more conventional approaches. The hybrid mechanism combines error correction at the individual word level with "warm spare" redundancy that can be implemented at the page, block, or full component level, consistent with the organization of NAND flash memory and how data is written into the memory components. Achieving this hybrid implementation requires a series of control mechanisms and lookup tables that are employed to implement the decisions about when to transition to the "warm spare" memory and when to discard blocks of memory as "bad blocks", a mechanism employed to permanently discard blocks of the memory that are no longer considered reliable storage.

One aspect of the present disclosure is a system comprising a wide word that is necessary to accept high speed incoming data without exceeding the relatively slow write access time of flash memory. In the example case, a very high speed serial link is spread into a 128-bit data word to support dividing down the clock to the point where flash memory programming speed can be supported. The width and speed of the incoming data can vary, resulting in different degrees of widening the incoming word.

An aspect of the present disclosure is a flash memory recorder comprising: an array of high-density flash memory comprising a plurality of multi-chip modules; a primary processor in communication with a primary field programmable gate array comprising a primary static random-access memory module, the primary processor being configured to control operations of the array of high-density flash memory; a primary magnetoresistant random access memory module communicating with the primary field programmable gate array and comprising a first error count lookup table and a first warm spare replacement lookup table; wherein information from the primary magnetoresistant random access memory module is also stored on the primary static random access memory; a redundant processor in communication with a redundant field programmable gate array comprising a redundant static random-access memory module, the redundant processor being configured to control operations of the array of high-density flash memory; and a redundant magnetoresistant random access memory module communicating with the redundant field programmable gate array and comprising a second error count lookup table and a second warm spare replacement lookup table; and wherein information from the redundant magnetoresistant random access memory module is also stored on the redundant static random access memory; at least one of the primary and redundant error count lookup tables is used to determine when to replace a bad block of data in the array of high-density flash memory; and at least one of the primary and redundant static random-access memory modules or at least one of the magnetoresistant random access memory modules, provides warm spare data to replace the bad block of data.

One embodiment of the flash memory recorder further comprises additional flash memory arrays with power switching per array to reduce power consumption as well as increase reliability when a particular array is not being accessed.

Another embodiment of the flash memory recorder further comprises an encryption module utilizing AES encryption to provide a protected downlink.

Yet another embodiment of the flash memory recorder further comprises an embedded microcontroller configured to control decisions about block byte replacement, error counting, and bad block designation.

Another aspect of the present disclosure is providing an array of high-density flash memory comprising a plurality of multi-chip modules; controlling the array of high-density flash memory using a primary processor in communication with a primary field programmable gate array comprising a primary static random-access memory module; storing a first error count lookup table and a first warm spare replacement lookup table on a primary magnetoresistant random access memory module communicating with the primary field programmable gate array; storing information from the primary magnetoresistant random access memory module on the primary static random access memory; controlling the array of high-density flash memory using a redundant processor in communication with a redundant field programmable gate array comprising a redundant static random-access memory module; storing a second error count lookup table and a second warm spare replacement lookup table on a redundant magnetoresistant random access memory module communicating with the redundant field programmable gate array; storing information from the redundant magnetoresistant random access memory module on the redundant static random access memory; utilizing error count lookup tables to identify a count of corrected errors against a user-defined threshold to determine when to replace a bad block of data with warm spare replacement data; and performing a warm spare replacement of the bad block of data on a block-level basis using the warm spare replacement data from at least one of the primary and redundant static random-access memory modules or at least one of the magnetoresistant random access memory modules.

One embodiment of the method of implementing a high reliability flash memory recorder further comprises providing additional flash memory arrays with power switching per array to reduce power consumption as well as increase reliability when a particular array is not being accessed.

One embodiment of the method of implementing a high reliability flash memory recorder further comprises: controlling, via an embedded microcontroller, decisions about block byte replacement, error counting, and bad block designation; utilizing steering logic, via the embedded microcontroller, to move incoming data to a warm spare byte when a replacement decision has been made; reading, via the embedded microcontroller, from a correct combination of data bytes, error correction code bytes, and warm spare bytes when a stored memory is accessed later; and encrypting a downlink, via an encryption module using AES encryption.

Another embodiment of the method of implementing a high reliability flash memory recorder is wherein the single array of high-density flash memory achieves a single printed wiring board density of a multiple terabit capacity recorder.

In some cases, the use of a spare bank of memory ensures that the original two Terabit capacity of the recorder will be maintained at end of life.

Yet another embodiment of the method of implementing a high reliability flash memory recorder further comprises using external radiation-hardened processors with third party file management and bad block management software for additional control of the flash memory array.

In certain embodiments, when the warm spare replacement of the bad block of data uses at least one of the primary and redundant static random-access memory modules, the primary and redundant magnetoresistant random access memory modules are updated periodically to provide a non-volatile copy of the warm spare replacement lookup table.

Yet another aspect of the present disclosure is a tangible, non-transitory, computer-readable media having instructions thereupon which, when executed by a processor, cause the processor to perform a method comprising: controlling, via an embedded microcontroller, decisions about block byte replacement, error counting, and bad block designation; utilizing steering logic, via the embedded microcontroller, to move incoming data to a warm spare byte when a replacement decision has been made; reading, via the embedded microcontroller, from a correct combination of data bytes, error correction code bytes, and warm spare bytes when a stored memory is accessed later; and encrypting a downlink, via an encryption module using AES encryption.

One embodiment of the tangible, non-transitory, computer-readable media having instructions thereupon when executed by a processor, causes the processor to perform a method, the method further comprising: providing additional flash memory arrays with power switching per array to reduce power consumption as well as increase reliability when a particular array is not being accessed.

Another embodiment of the tangible, non-transitory, computer-readable media having instructions thereupon when executed by a processor, causes the processor to perform a method, wherein the single array of high-density flash memory achieves a single printed wiring board density of a multiple terabit capacity recorder.

In some cases, the use of a spare bank of memory ensures that an original capacity of the recorder will be maintained at end of life. In certain embodiments, using external radiation-hardened processors with third party file management and bad block management software provides for additional control of the flash memory array.

Yet another embodiment of the tangible, non-transitory, computer-readable media having instructions thereupon when executed by a processor, causes the processor to perform a method, the method further comprising: providing for increased data capacity efficiency with the same number of multichip modules by using a less robust redundancy and error correction capability. In some cases, the method further comprising: utilizing single bit correction/double bit detection (SEC/DED) error correction.

Certain embodiments of the method of implementing a high reliability flash memory recorder further comprise providing for increased data capacity efficiency with the same number of multichip modules by using a less robust redundancy and error correction capability, by implementing ten data bytes, one error correction code byte, and one warm spare byte.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

Figure 1:
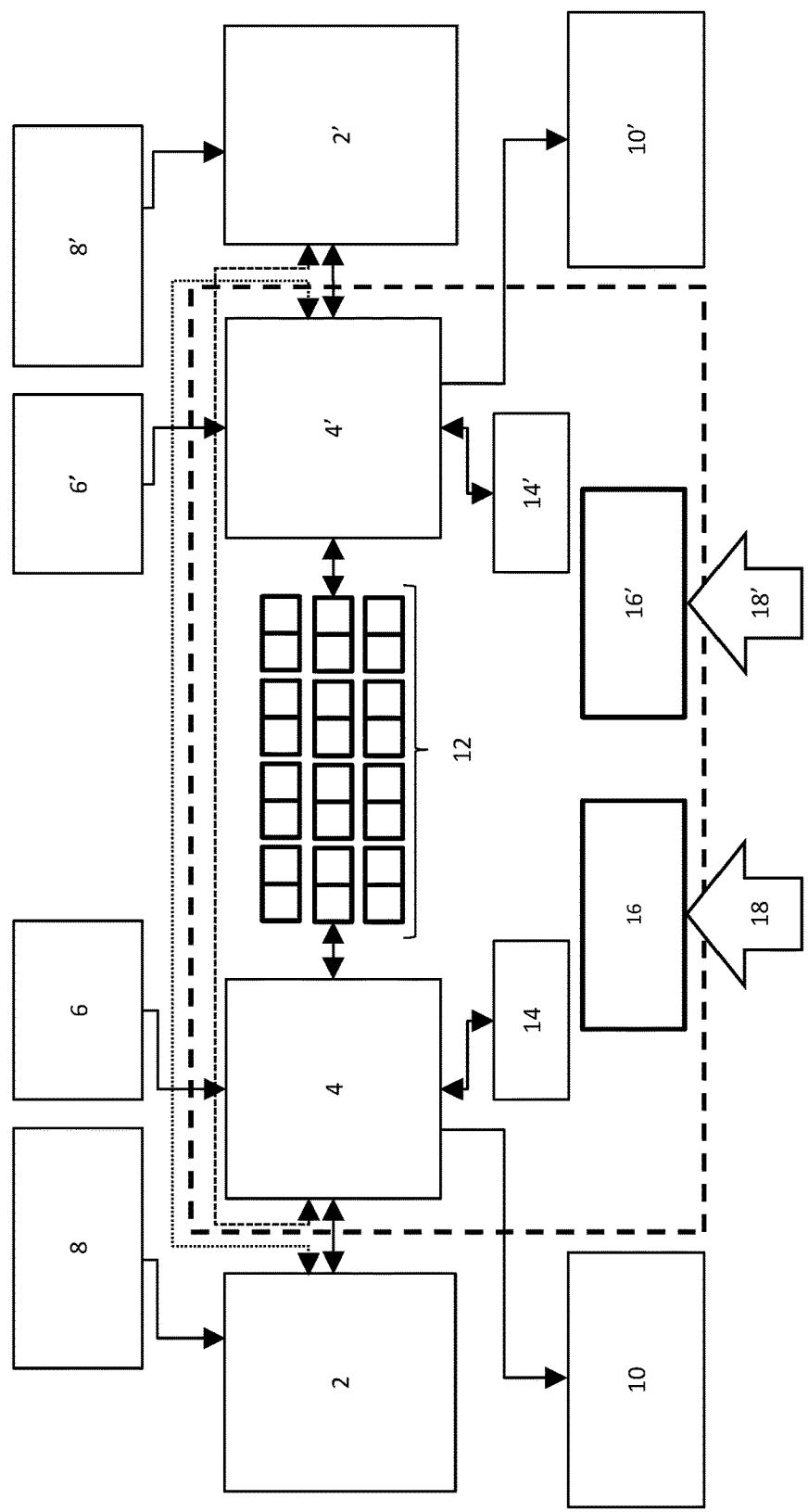
FIG. 1 shows a top level block diagram of one embodiment of a flash-based recorder of the present disclosure.

NAND flash memory provides high capacity non-volatile storage at relatively low cost, making it attractive for many applications. For typical applications, some level of enhanced reliability can be achieved through error correction code (ECC) and spare areas of memory are typically provided to support this, but this approach is not sufficient for high reliability applications. Conventional solutions for providing high reliability flash memory applications consist of redundancy through triplicating the memory array (called Triple Modular Redundancy or TMR) and performing a two of three vote upon every read operation. This requires three times the amount of storage actually needed to store the data. As a result, it is costly, heavy, dissipates additional power, and takes up a lot of space.

In contrast, the present disclosure uses an ECC byte and a "warm spare" byte, combining the concepts of error correction and redundancy. This approach decreases the amount of overhead memory to 1.5 times the actual data storage while providing a similarly robust level of reliability.

While this disclosure is specific to a high capacity storage unit based on flash memory and with a planned use in the space environment, it can just as easily be applied to any related application where high reliability is important. There is nothing specific about the system that makes it applicable only to space applications.

One embodiment of the present disclosure relates to alternative methods of implementing error correction in a flight recorder. In one embodiment of the method, a device for Error Correction Code (ECC) and a "warm spare" are used as a substitute for any of the other devices in the recorder in order to increase system reliability and availability with less overhead. In certain embodiments, the system creates lookup tables with the replacement data as well as the error count to keep track of the status of errors detected in the flash memory array, both corrected and uncorrectable, and uses this information in conjunction with a microcontroller to make decisions on when to replace a specific byte with the "warm spare" and when to go further and declare a partition of flash memory a "bad" block that is not to be used again. One embodiment also defines the architecture of software executed on the microcontroller and how that software interacts with other software executing on an accompanying general purpose processor. In one embodiment of the system, the interaction of the flash memory array with redundant FPGAs and redundant processors provides additional levels of reliability.

Another aspect of the disclosure is the use of single bit correction/double bit detection (SEC/DED) error correction to support additional reliability at the word level. While the use of SEC/DED error correction is not unique, as it is commonly employed for volatile dynamic RAM (DRAM) memory, DRAM can be written quickly and supports a much larger number of lifetime write cycles than NAND flash memory. Thus, the conventional mechanism of writing back the corrected data as needed is impractical for flash memory. In addition, the conventional approach does not cover a mechanism to recover from the loss of a page or block of memory or even the loss of a full component. The conventional approach to addressing this issue is to triplicate the memory, read all three copies and vote two out of three during a read operation, but the overhead associated with this approach is obtrusive, particularly as the required memory array continues to increase in size. Because of this, an aspect of the present disclosure is to combine the use of SEC/DED error correction with a byte-wide "warm spare" component that can be used to swap out any of the data bytes or the ECC byte for an entry on a partial or complete die basis.

One of the elements of this disclosure involve the mechanisms to control how and when the decision is made to substitute the "warm spare" component in place of one of the existing components, either one of the data bytes or the ECC byte, as it is irrelevant which fails in each case. In this implementation, the substitution is performed at the block level, consistent with the defined mechanism for removing "bad blocks" from a flash memory array. It could also be substituted at the page level, which is the smallest increment of programming supported by NAND flash memory.

In one embodiment of this disclosure a pair of tables that are maintained and modified as needed to keep track of sparing decisions are used. The first table is for replacement data and determines which byte the "warm spare" byte has replaced for a given block and it is used to steer data on subsequent program and read operations. The second table for the error count keeps count of the correctable errors incurred within a block of memory and that count is compared against a user defined threshold to trigger the "warm spare" insertion.

In one embodiment of the system, supporting mechanisms employing software executing on a general purpose processor are used for wear leveling of the blocks of flash memory and to label "bad blocks" as well as for file management. If a high performance processor is available within the recorder controller component, it may be possible to eliminate the external general purpose processor entirely. In the embodiment of the system as shown in the figures, a pair of general purpose processors is provided in a primary/redundant configuration, and is matched with primary/redundant recorder control components in a cross-strapped configuration for maximum flexibility and reliability. In this case, the flash memory array is common to both the primary and redundant processors as it already incorporates redundancy.

Referring to FIG. 1, a top level block diagram of one embodiment of a flash-based recorder of the present disclosure is shown. More specifically, in one embodiment the flash-based recorder is used in space. In this example, two space-hardened processors, a primary processor 2 and a redundant processor 2', are responsible for command and control and file management of a common non-volatile storage array. While in cases of very high reliability needs redundant memory arrays could be employed, the common array reduces size, weight, and power and eliminates the requirement to maintain coherency in the redundant array. In some cases, the command and control input data 8, 8' is streamed at about 256 Mb/sec from the processors 2, 2'. A pair of field-programmable gate arrays (FPGA) is also used, where an FPGA is a programmable/reprogrammable integrated circuit. In this application the FPGAs are also space-hardened. A primary FPGA 4 and a redundant FPGA 4' are used with sensor data that is streamed in at about 2.5 Gb/sec 6, 6'. A SERDES (serializer/deserializer) is used for the data coming in at about 3.125 Gbaud, where a baud is the number of distinct symbol changes (signaling events) made to the transmission medium per second in a digitally modulated signal or a line code. The SERDES refers to a serializer/deserializer, which provides a way of splitting very fast data into a series of slower data streams, effectively widening the data, and then combining the wider data back into a faster/narrower data stream. In another embodiment, the same approach to sparing and ECC in the array can be applied to a system which reads and writes through a wide parallel bus, eliminating the need to spread the data into the multiple memory devices and to recombine them during reads.

To support extended mission lengths, redundancy and spare memory banks are added to compensate for blocks of memory that become permanently damaged. One embodiment of the flash-based recorder can support a variety of input and output data rates; in this example, a single SERDES lane @ 3.125 Gbaud acts as the input source (6, 6') and either a single 600 Mbps differential link (e.g., low voltage differential signaling (LVDS) physical layer) with double data rate (DDR) data transfers (i.e. two bits per cycle) or a 3.125 Gbaud SERDES comprises the output (10, 10'). In some embodiments, the output (10, 10') is also encrypted.

Still referring to FIG. 1, the architecture of this flash-based recorder in one example leverages the use of both word-level single bit error detection/double bit error detection (SEC/DED) error correction code (ECC) and "warm sparing" to reduce the overhead of the system while delivering high reliability and high availability as compared to conventional approaches. In some cases, the data recorder of the present disclosure also takes advantage of an external general purpose processor executing file management software. In other cases, a version of the flash memory recorder which embeds the processing capability is also possible.

In certain embodiments of the data recorder, commercial flash memory components are packaged into multi-chip modules (MCMs) with superior radiation characteristics for both improved density and performance. In certain embodiments, the MCMs comprise a common flash array with "warm spare" and "spare" banks 12. For illustrative purposes, in one example there are three banks of flash memory each comprising 1 Terabits (Tb) of data and 0.5 Tb of error correction and warm spare for a total capacity at the beginning of life of 3 Tb. See, FIG. 4B. The internal organization of the flash memory itself is more clearly defined in FIG. 4A, a pair of MCMs includes all four bytes of data (a-d), the ECC byte (e), and the spare byte (f) for two sets of 6 die. The number of data memories vs. sparing and error correction components can be traded against reliability requirements. For example, storage efficiency can be increased by 25% through the use of 10 data devices supported by single spare and ECC devices, thereby reducing reliability in that only one of 10 devices can be replaced vs. one of four and with ECC generated over a wider word width.

Still referring to FIG. 1, there are primary and redundant magnetoresistive random access memory (MRAM) modules 14, 14'. In some cases the MRAM are 16 Mb and a lookup table, to be discussed in more detail later, is stored in non-volatile memory, while a local volatile lookup table is stored within the FPGA 4, 4' to reduce latency. There are primary and redundant power converters and low-voltage, high efficiency point-of-load converters as well (16, 16'). In some cases, the converters inputs are either 28V or 100V (18, 18'), dependent upon the platform into which the recorder is inserted.

Figure 2:
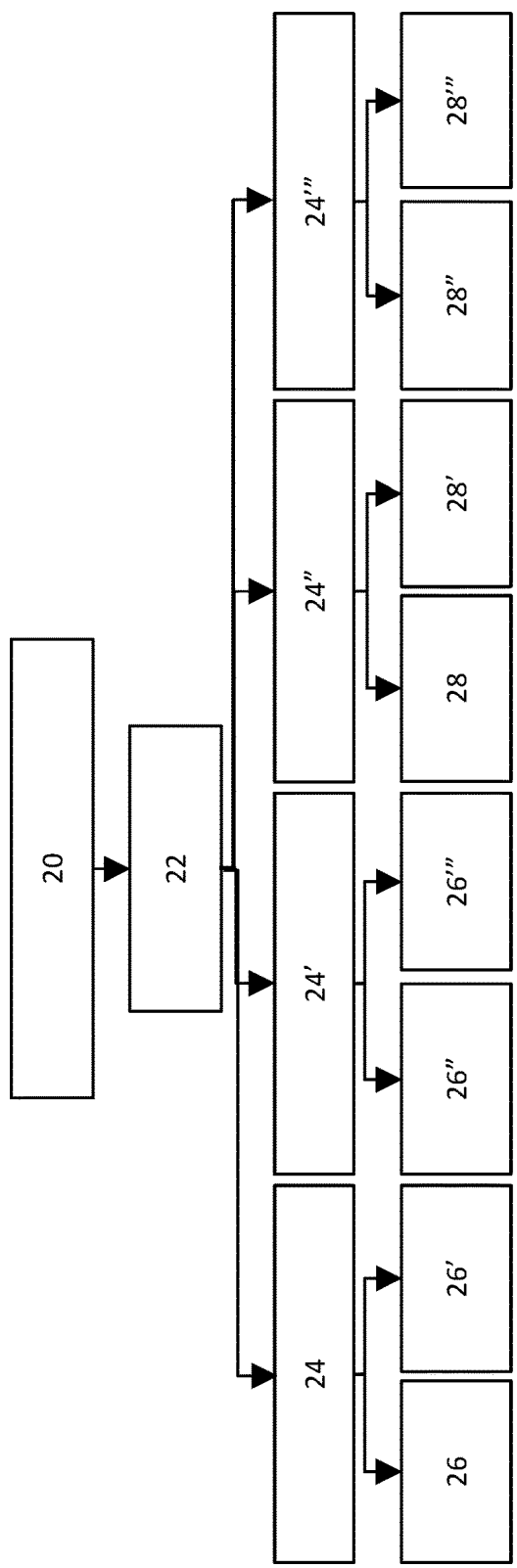
FIG. 2 shows a block diagram of one embodiment of the flash-based recorder concept of the present disclosure.

Referring to FIG. 2, a block diagram of one embodiment of the flash-based recorder concept of the present disclosure is shown. There, a very wide flash word supports the input at 3.125 Gbaud (2.5 Gbps after 8b/10b encoding) matched to flash page programming time. More specifically, the input signal 20 is streaming at about 3.125 Gbaud. A SERDES provides for the bytes to be written at 312.5 MHz 22. Error correction code (ECC) is then generated across each of four groups of four data bytes at 19.53 MHz (24, 24' 24", 24''') and the four sets of steering logic are employed to determine which byte (if any) from each group is to be loaded into the warm spare component. This results in a 192-bit interface to the flash memory array when including the four ECC bytes and four warm spare bytes. The flash MCM each comprise 6 die as 8G×24 (26, 26', 26", 26''', 28, 28', 28", 28''').

In certain embodiments, the time it takes to program a flash page is about 350 microseconds, and each page is defined as 8,192 bytes for this capacity of flash memory device (32 Gb), so the time to program a byte is about 42.7 nanoseconds. The maximum possible programming speed per byte is then 23.4 MHz. With the input arriving serially at 2.5 GHz, it would require 13.3 data bytes in parallel to accept the input at the maximum possible speed. In one embodiment, by using 16 data bytes (128 bits), 4 ECC bytes, and 4 "warm spare" bytes, flash programming can be performed at 19.53 MHz. A "warm spare" byte is provided for enhanced fault tolerance in the recorder. Using wide flash words 2.5 Gb/sec input data is accommodated using a 3.125 Gbaud SERDES with 8b/10b encoding/decoding with margin vs. the maximum flash programming rates.

Figure 3:
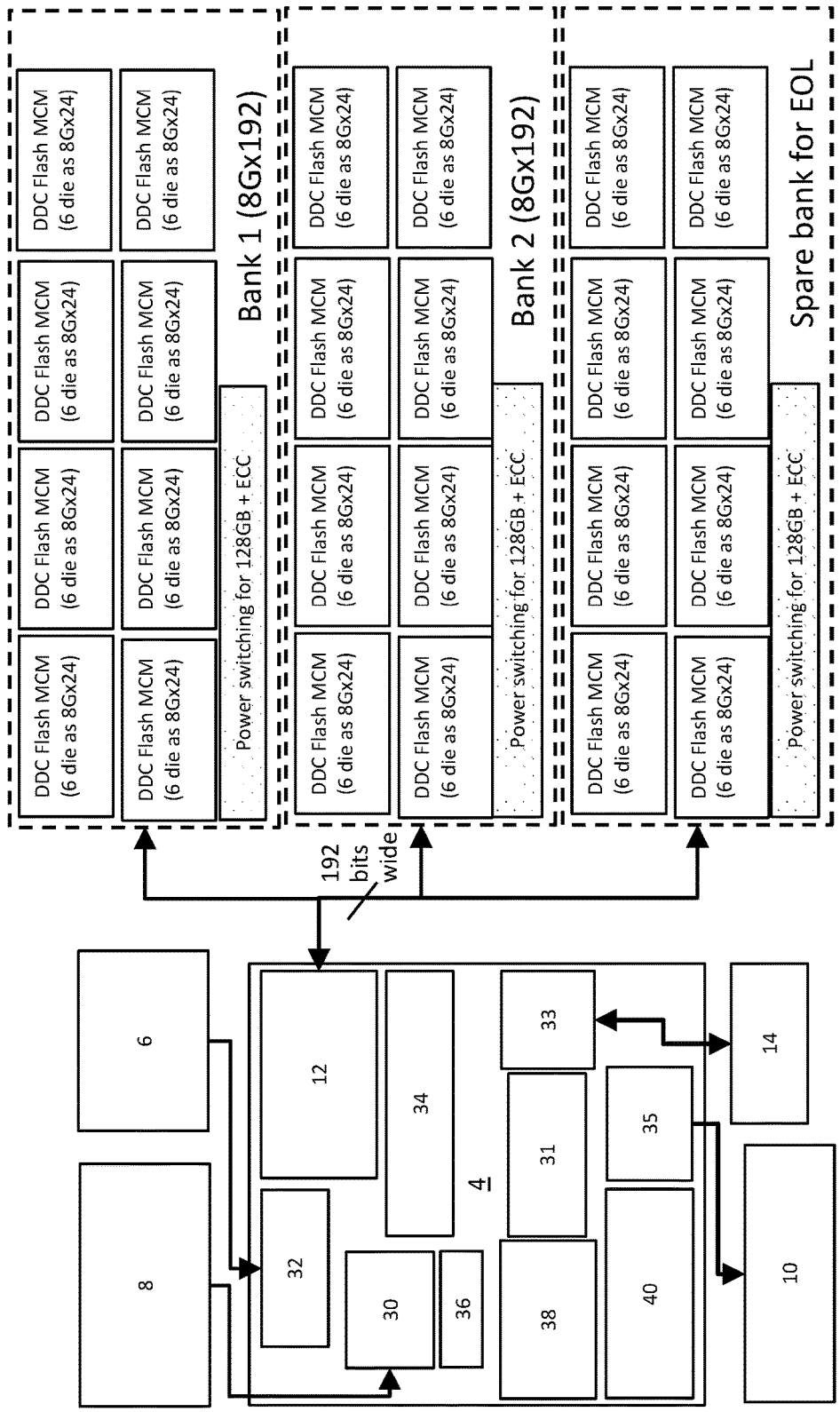
FIG. 3 shows a detailed block diagram of one embodiment of a flash-based recorder of the present disclosure.

Referring to FIG. 3, a detailed block diagram of one embodiment of a flash-based recorder having three banks of 1.5 Tb each, for a total of 4.5 Tb, is shown. There, 2 Tb of recorder capacity is for end of life assuming there is some loss over time to "bad blocks" of flash memory. More specifically, an added bank of flash provides for added end of life margin for missions of extended duration. For shorter missions, cost can be decreased by eliminating the extra bank. In one example, Bank 1, Bank 2 and the Spare Bank to ensure maintaining full capacity for end of life (EOL) each comprise eight flash MCMs (six die as 8G×24) for 8G×192 with Power switching for 128 GB+ECC. These Banks comprise the flash memory controller with the "warm spare" and the ECC support 12. As shown, the interface between the FPGA and the memory array is 192 bits wide, consisting of a 128-bit data word interspersed with 32 bits of ECC and 32 bits of warm spare memory in groups of 48 bits.

Still referring to FIG. 3, the FPGA 4 is in communication with the processor tasked with command and control and file management. The data input is at about 256 Mb/sec 8 using space wire router and links 30 in one embodiment. The streaming data input 6 at 2.5 Gb/s SERDES 3.125 Gbaud is in communication with the FPGA 4 using FIFO and parallelism 32. In some cases, a 16 KB block warm spare replacement lookup table 34 is present, as is one or more CAN bus controllers 36, an embedded microcontroller (EMC) with RAM 38, and embedded non-volatile configuration logic 40. There is a flash memory power switching module 31 for reduced power consumption and increased reliability over time, and a MRAM memory controller 33 that is in communication with an MRAM module 14 that provides non-volatile storage of the key tables. In this example, the output 10, is run thorough an encryption module 35 using AES, or the like to provide a protected downlink. Here, the encrypted output 10 is 600 Mbps LVDS or 3.125 Gbaud SERDES to downlink.

The FPGA 4 buffers the data coming in from the payload, controls the flash array and MRAM tables via the embedded microcontroller (EMC), encrypts output data, and writes to the transmitter. The 4-port SpaceWire router 30 accepts command and control data, wear leveling, and file management data from the processor 8 and is also used to output data from the MRAM to the processor to feed into the redundant MRAM to maintain coherency of the lookup tables, two CAN buses 36 also provide industry standard low rate interfaces. The incoming data from the payload 6 is buffered in a FIFO manner and parallelized to the wide word used to store into the flash array.

The flash controller 12 includes ECC generation and checking and data steering to take advantage of the "warm spare" array architecture. As one example, it sends a 192-bit word to the array (four groups of 48 bits, each of which consists of 32 bits of data, 7 bits of ECC (1 bit of the ECC byte is unused), and 8 bits of warm spare. An on-die SRAM-based lookup table 34 keeps warm spare replacement information readily available to minimize latency during operation as the MRAM cannot be accessed fast enough to support full performance operation. The MRAM memory controller 33 provides control to non-volatile storage for the replacement lookup table and the error count table. Flash memory power switching 31 turns off unused banks of the array to reduce power and minimize the risk of transient or destructive upsets. The embedded microcontroller 38 controls decisions about block byte replacement, error counting, and bad block designation. The AES encryption core 35 generates AES-256 encryption using a feedback-based AES algorithm that provides a superior encrypted output vs. other AES "modes." The embedded non-volatile configuration logic 40 stores the configuration information for the FPGA itself, eliminating both a fuse-blown FPGA and redundant flash modules, saving cost. In one embodiment, a Microsemi RTG-4 FPGA supports flexible requirements including optional encryption while saving the cost of external configuration memory support.

In certain embodiments, the sizing of the FPGA demonstrates that the baseline recorder features according to the present disclosure can be achieved within the available resources. As can be seen in Table 1, below, one embodiment of the FPGA makes heavy use of the larger block SRAMs and look-up tables (LUT), but is otherwise only moderately populated.

Figure 4B:
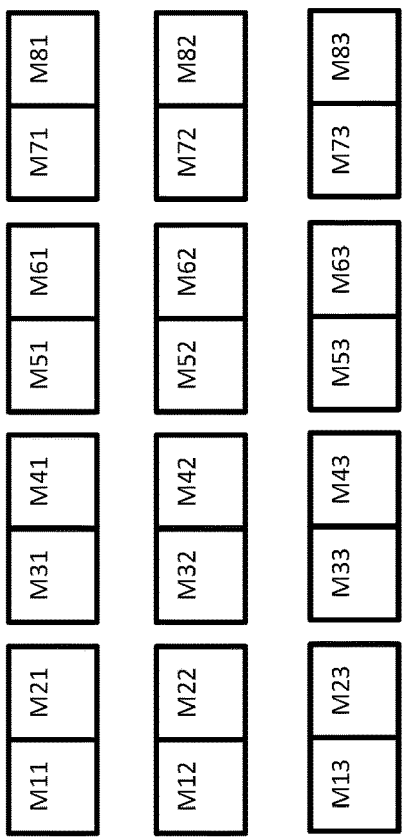
FIG. 4A and FIG. 4B show block diagrams of one embodiment of the warm spare flash-based recorder organization of the present disclosure.
Figure 4A:
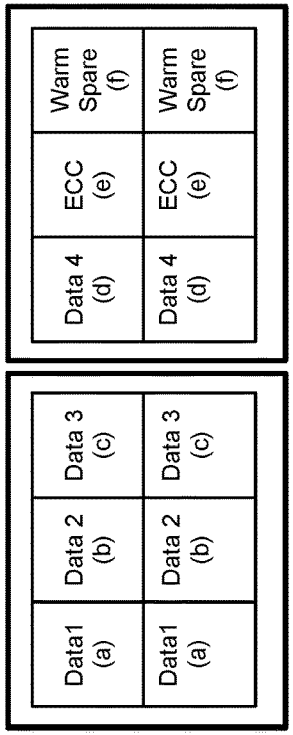

Referring to FIG. 4A and FIG. 4B, block diagrams of one embodiment of the warm spare flash-based recorder organization of the present disclosure is shown. More specifically, each pair of MCMs provides for the repeated increment within the recorder. Use of a combination of ECC (e) and warm sparing (f) provides fault protection similar to that of triple modular redundancy with only half the overhead, thus lowering the cost, space, weight, and power of the system.

In one embodiment as shown in FIG. 4A, the increment in the recorder that is spared is two 6-die MCMs where each MCM is organized as three 8-bit die wide and two deep. The four data bytes (a-d) are spread across both MCMs and the ECC byte (e) and warm spare byte (f) reside in the $2^{nd}$ MCM. A bank of flash consists of eight of these 6-die MCMs (organized as 128 bits of data, ECC/32 bits, spare per five chips (4 data+ECC)). That totals 32 data chips (a, b, c, and d), 8 ECC chips (e) and 8 warm spare (f) chips across the eight MCMs (M1-M8) that comprise a bank of flash as

TABLE 1

| Module | Regs | LUT, 4-input | RAM (24.5 kbit) | RAM (1.5 kbit) | Math block | CCC/PLL | SERDES Lanes | IO (LVCMOS/LVDS) |
|---|---|---|---|---|---|---|---|---|
| CAN 1 (CAN bus interface core) - with AXI4-Lite I/F | 646 | 3096 | 1 | 0 | 0 | 0 | 0 | 3 |
| CAN 2 (CAN bus interface core) - with AXI4-Lite I/F | 760 | 2440 | 0 | 0 | 0 | 0 | 0 | 3 |
| AXI crossbar | 4342 | 14464 | 4 | 16 | 0 | 0 | 0 | 0 |
| Flash memory controller (8 KB Page Buffer, 2 KB Cmd/Status RAMs, 16 KB Look Up Table) | 1414 | 5819 | 14 | 0 | 0 | 0 | 0 | 212 |
| AXI DMA Controller | 1088 | 4352 | 0 | 0 | 0 | 0 | 0 | 0 |
| Embedded Microcontroller (EMC) | 2544 | 12604 | 6 | 0 | 4 | 0 | 0 | 0 |
| EMC SRAM (64 KB) | 387 | 2126 | 28 | 0 | 0 | 0 | 0 | 0 |
| JTAG test logic interface | 229 | 528 | 0 | 0 | 0 | 0 | 0 | 5 |
| 64-bit OCB to 128-bit AXI bridge | 956 | 2962 | 13 | 0 | 0 | 0 | 0 | 0 |
| On-Chip Bus (OCB) | 631 | 8604 | 0 | 0 | 0 | 0 | 0 | 0 |
| Router interface (RIF) 0 | 1709 | 6626 | 13 | 0 | 0 | 0 | 0 | 0 |
| Router interface (RIF) 1 | 1616 | 6408 | 13 | 0 | 0 | 0 | 0 | 0 |
| Router interface (RIF) 2 | 1616 | 6408 | 13 | 0 | 0 | 0 | 0 | 0 |
| Router interface (RIF) 3 | 1616 | 6408 | 13 | 0 | 0 | 0 | 0 | 0 |
| SpaceWire 4-port router | 6602 | 16258 | 25 | 0 | 0 | 0 | 0 | 16 |
| AXI MRAM memory controller | 2164 | 2906 | 0 | 0 | 0 | 0 | 0 | 12 |
| AES-256 encryption w/key expander | 2475 | 2475 | 3 | 0 | 0 | 0 | 0 | 0 |
| AXI to Encryption FIFO I/F | 825 | 3150 | 4 | 0 | 0 | 1 | 0 | 0 |
| Payload SerDes Interface/Discretes | 900 | 3300 | 4 | 0 | 0 | 1 | 1 | 24 |
| FPGA top level logic | 256 | 512 | 0 | 0 | 0 | 1 | 0 | 15 |
| Totals: | 32776 | 111446 | 155 | 16 | 4 | 3 | 1 | 290 |
| RT4G150 resources: | 151824 | 151824 | 209 | 210 | 462 | 8 | 24 | 720 |
| % Utilization: | 21.6% | 73.4% | 74.2% | 7.5% | 0.9% | 37.5% | 4.2% | 40.3% |

It is understood that for encryption modes, the method chosen can affect the level of security achieved. One method of encrypting data using an AES algorithm is to split data into 128-bit blocks and run each block through the algorithm. This "mode" is called Electronic Codebook (ECB) and it is both simple and has no requirements for data ordering which is good for databases. However, the same plain text data will always result in identical encrypted data when using the same key. This is a shortcoming because repeated data can be seen in the encrypted output. Another encryption method is to use a feedback-based AES algorithm such as Cipher Block Chaining (CBC), Cipher Feedback Mode (CFB), or Counter mode (CTR). Additionally, use of a feedback-based algorithm that includes SHA authentication, such as the Cipher Block Chaining—Message Authentication Code (CCM) mode or the Galois/Counter Mode (GCM) could also be used depending on the needs of the user.

shown in FIG. 4B. Each bank is 1.5 Tb, of which 1 Tb is data. So, three banks (M11-M81, M12-M82, and M13-M83) comprise the full recorder with 50% margin for end of life (3 Tb for 2 Tb end of life). With 4,096 (4K) blocks per memory chip and 40 replaceable chips ((16 data chips+4 ECC chips)*2 chips deep) per bank, it would require 4,096*40=163,840 bits to show which die had been replaced in every case. Using a 3-bit code to specify which of the five potential die to replace requires only 4,096*8=32,768 (32K) entries per bank. That is 98,304 (96K) entries to support the blocks in the entire recorder.

Figure 5B:
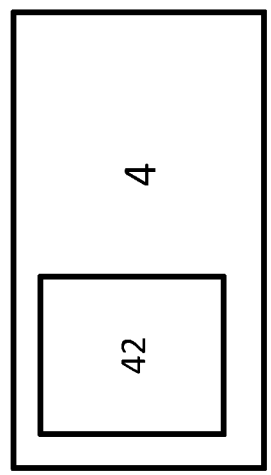
FIG. 5B shows a block diagram of one embodiment of a warm sparing block lookup table according to the principles of the present disclosure.
Figure 5A:
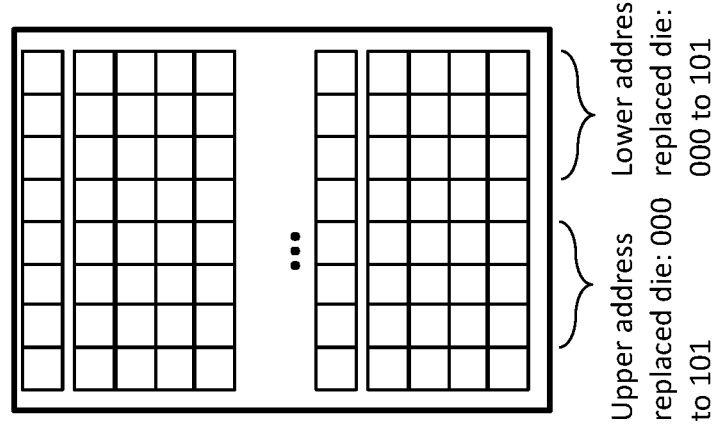
FIG. 5A shows a block diagram of one embodiment of a warm sparing block lookup table according to the principles of the present disclosure.

Referring to FIGS. 5A and 5B, block diagrams of one embodiment of a warm sparing block lookup table according to the principles of the present disclosure is shown. More specifically, in one embodiment warm sparing data is stored in the lower part of the MRAM, with two entries per MRAM byte. In some cases, using a 3-bit code for the die to be replaced, 96 k 3-bit entries will support all three banks of flash at the block level. The 3-bit code is sufficient to cover replacement of the die in the example organization (4 data, 1 ECC, 1 spare). If a less robust replacement scheme was employed to increase data efficiency (such as 10 data, 1 ECC, 1 spare), a four-bit code might be needed vs. three-bit, which can fit in the same memory area as bits are currently unused. By putting two 3-bit entries within an 8-bit memory word it reduces the amount to 48K bytes, which grows to 60K bytes when the interleaved ECC bytes are added.

In one example, within the 16 Mb MRAM devices the information relating to which of the five die (four data or ECC) is to be replaced is contained as a 3-bit value. The upper address die is in the most significant bits (MSB) and the lower address die is in the least significant bits (LSB), with unused bits completing the 8-bit word. In one case, block replacement values are the following: 000=no replacement; 111=bad block; and 001-101 is the byte to be replaced, where 101 is the ECC byte.

For every four stored data words in the MRAM, there is a fifth word for the single error correction/double error correction (SEC/DED) ECC to provide for enhanced reliability of the lookup tables themselves. In one embodiment of the RTG-4 FPGA 4, the lookup table 42 for one full bank (16 KB) of the recorder is maintained for quick access and high performance, requiring 16 KB of SRAM plus SEC/DED ECC (built-in for the Microsemi RTG-4 FPGA). This example uses eight of the available 209 SRAMs.

Using the MRAM, the lookup table is maintained in non-volatile memory while the local volatile lookup table within the FPGA reduces latency. For example, the warm spare replacement data can be stored in MRAM and a copy of the warm spare replacement data would be also stored in SRAM in the FPGA, wherein the warm spare replacement data is refreshed according to a refresh cycle. In some cases, one can trade the ability to simultaneously maintain all three banks (24 SRAMs) in the FPGA, based on fit and performance. This would eliminate the need to swap out the data stored in the low-latency SRAM, which would introduce latency when switching between banks of flash memory. Updates would be made in real time to the SRAM and then written back to the MRAM on a regular basis when less flash accesses are occurring to guarantee that a coherent non-volatile copy is maintained in case of power loss or reset.

Figure 6:
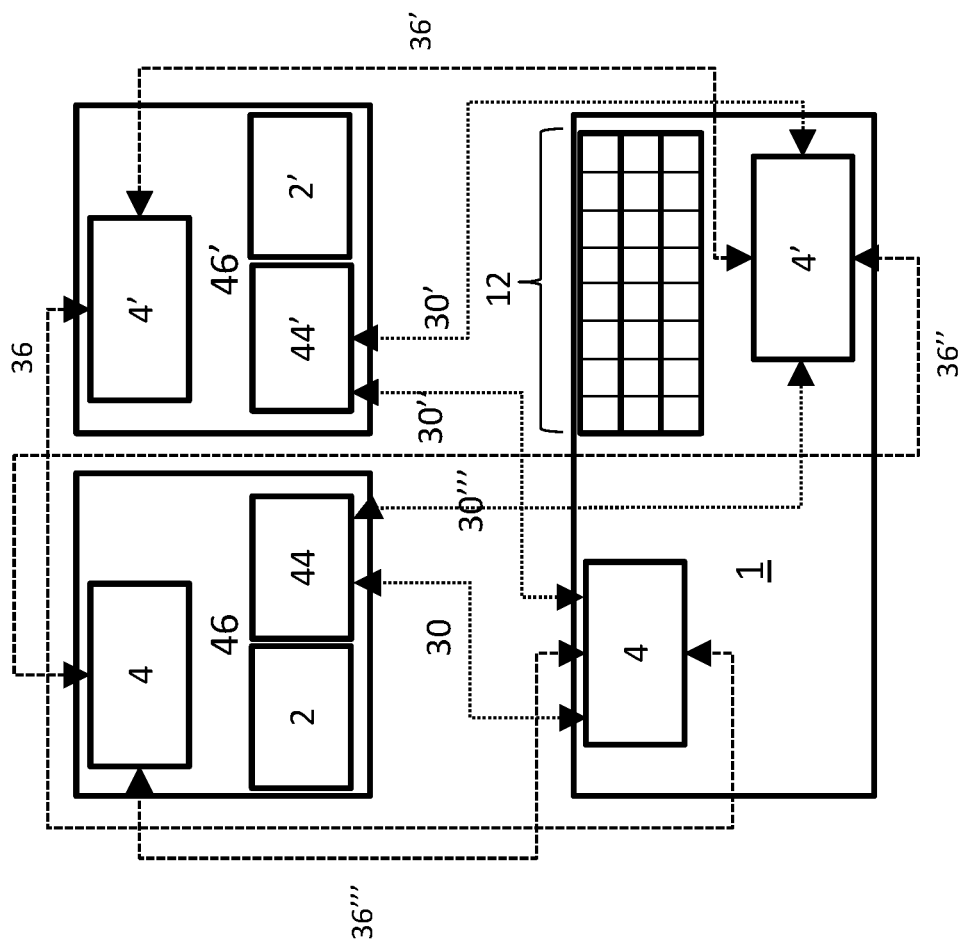
FIG. 6 shows a block diagram of one embodiment of the flash-based recorder of the present disclosure.

Referring to FIG. 6, a block diagram of one embodiment of a flash-based memory recorder of the present disclosure is shown. More specifically, one embodiment of the recorder leverages up to a pair of redundant processors 2, 2' to execute wear leveling, bad block management, and file management. Leveraging unused capacity in an external processor for file management software eliminates the need for a dedicated processor at higher cost and SWaP. In one embodiment, a RAD750® processor 2, 2' executes software to support recorder wear-leveling, bad block management, and file management. In some cases software provides both wear-leveling and bad block management. In some cases software provides file management with a small footprint. In certain embodiments, unused capacity in an external processor is leveraged to avoid the need for a dedicated processor and memory within the recorder 1. When two processors (2, 2') are used in parallel, redundancy of the recorder control for a single common array 12 is achieved. There, the processors communicate with the recorder across SpaceWire 30, 30', 30", 30'" links (data) and/or CAN bus (commands) links 36, 36', 36", 36'" which are already built into the processor cards, as shown. In one embodiment, a RADNET™ SpW-RB4 bridge Application Specific Standard Product (ASSP) 44, 44' provides a SpaceWire router with up to four SpaceWire links. The recorder FPGA also includes a four-port SpaceWire router and CAN bus links, so each of the two FPGAs 4, 4' can accept data and commands respectively from each of the two single board computers (SBC) to minimize any likelihood of single-point failure. 46, 46'. In emerging technologies, it will be possible to build the processor function directly into the FPGA for improved size, weight, and power (SWaP) in the recorder implementation.

Figure 7:
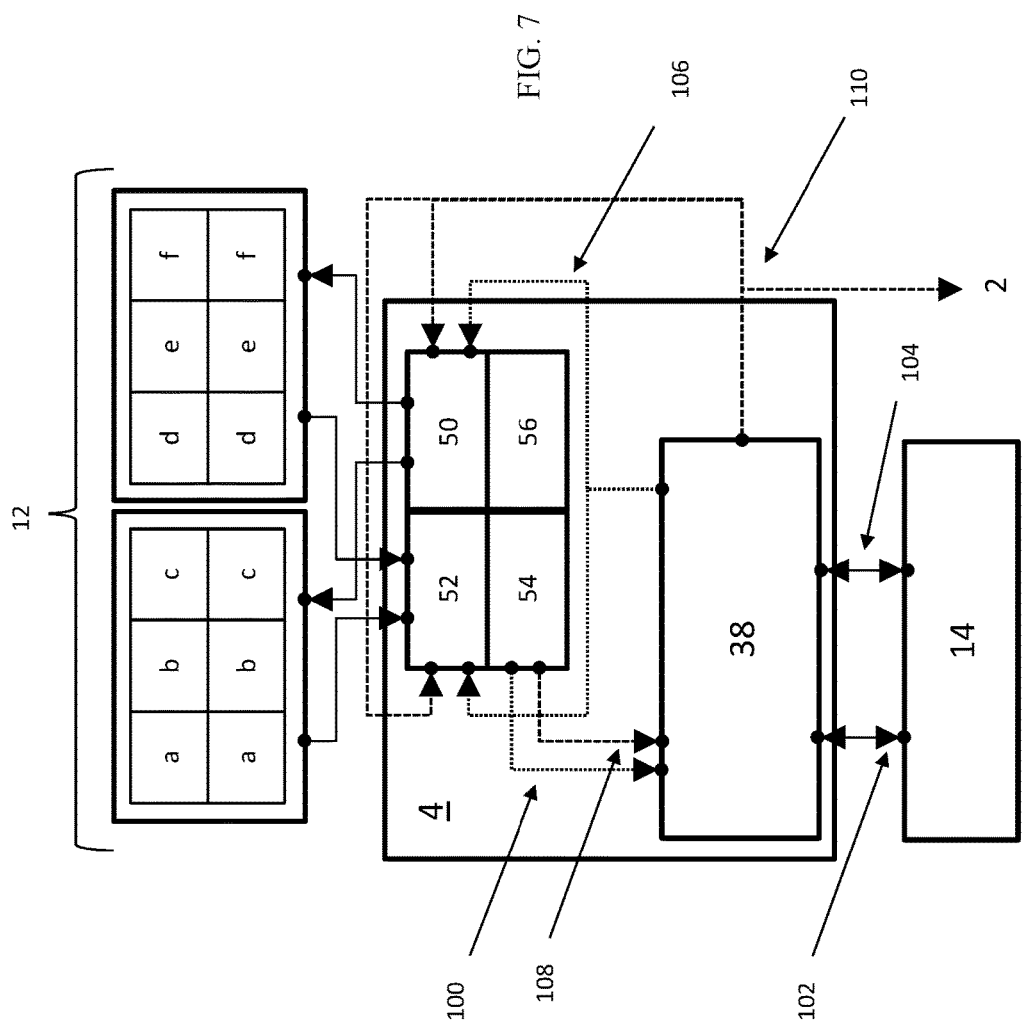
FIG. 7 shows a block diagram of one embodiment of block byte replacement according to the principles of the present disclosure.

Referring to FIG. 7, a block diagram of one embodiment of block byte replacement according to the principles of the present disclosure is shown. More particularly, byte replacement software within the embedded microcontroller (EMC) 38 keeps track of errors in the flash array 12 and decides when to do a block byte replacement. The EMC 38 in the FPGA 4 handles local flash memory array control with low latency. The EMC within the FPGA executes code to keep track of the data steering to/from (50/52) the flash array 12 and to record and increment the corrected error count based on information provided by the ECC checker 54.

In one embodiment of the present disclosure for correctable errors, upon a READ, if there is a corrected error, the ECC checker 54 sends data to the EMC 38 with the byte number of the word from the ECC generator 56 that has been corrected 100. The EMC 38 reads the matching "block corrected error count" 102 from MRAM or from the lower latency on-die SRAM (not shown), increments it, checks it against a defined threshold, then writes it back to MRAM 14 or the on-die SRAM where the MRAM 14 will be updated later if not possible in real-time. When the threshold is exceeded, the EMC 38 issues a "byte replace" 104 for that block and that is written to the MRAM and/or on-die SRAM 14. Based on the assumption that the error that exceeds the threshold is most likely in the byte which fails most often, that is the byte that is replaced. If for any reason this is not the case, then it is possible for the byte to be replaced to be swapped out for the correct byte at a later time. Following the block ERASE operation, upon the next WRITE to that block, the EMC 38 reads the "block byte replace" 106 value from on-die SRAM or MRAM. If a replace value is set, the EMC steers the data for that block into the warm spare.

In one embodiment of the present disclosure for uncorrectable errors, upon a READ, if there is an uncorrectable error 108, the EMC issues a "bad block" 110 to the block replace entry in the MRAM and then notifies the software running on the RAD750 SBC 2. Upon a subsequent WRITE, the "bad block" entry is read from MRAM 14 and the EMC 38 does not write to that block. Another block is chosen by the software and that is used subsequently.

Figure 8:
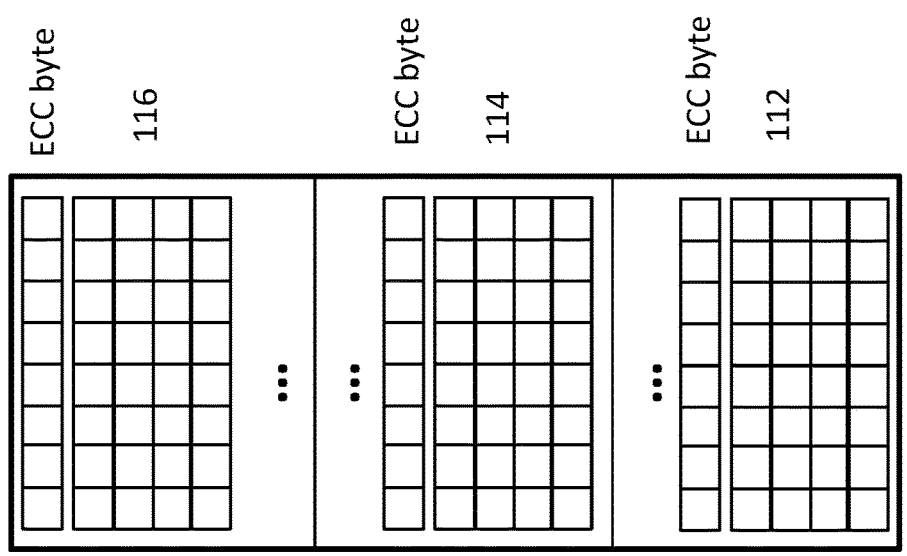
FIG. 8 shows a block diagram of one embodiment of block byte replacement according to the principles of the present disclosure.

Referring to FIG. 8, a block diagram of one embodiment of block byte replacement according to the principles of the present disclosure is shown. More particularly, the MRAM stores the block byte replacement information for the array, the block corrected error count, and EMC boot code. In one embodiment, a single MRAM module per FPGA stores both operational lookup tables and EMC boot code, eliminating the need for additional EEPROM components.

In one embodiment of the system of the present disclosure the first words of the MRAM store the EMC boot code in an EMC boot code partition 112. Above that, the lower 48 KB of the MRAM are used to store the block byte replacement information in a block byte replacement partition 114. All bytes in this partition are initialized to all zeros. When a determination is made to replace a block, the 3-bit value of the byte to be replaced in each block is stored in the location in the MRAM. When a determination is made that the block is "bad" the 3-bit value is changed to 111. Two block replacement values are stored in each MRAM byte; the MSB of each available 4-bit value is not used. The upper part of the MRAM is used to store the block corrected error count in a block corrected error count partition 116. In this case as well, the corrected error count can store the block error corrected count for two sets of 6 die as 4-bit values allowing for up to 15 corrected errors before hitting the threshold (user adjustable via software) to minimize MRAM memory requirements. Alternatively, using more memory the error corrected count could be a full 8-bit value in each case, extending the user-definable threshold up to 255 errors.

When a block is read and corrected errors are flagged, the corrected error entry for that block is read, incremented, and written back. Once a decision is made to replace a byte based upon exceeding the threshold, the corrected error count is reset. The next time the threshold is exceeded, the block is defined as "bad." The block is also defined as "bad" if an uncorrectable error occurs in that block. Again, this decision is up to the user. Software could allow multiple exceedances of the threshold if using a lower threshold value prior to issuing the "bad block" definition.

In one embodiment of the flash memory recorder of the present disclosure a cost-effective warm sparing approach is used to achieve high levels of fault tolerance with less components. In certain applications, the recorder can achieve excellent performance for mission lifetimes of five years and beyond. By leveraging an external processor (either one or two redundant for higher reliability) to support the flash memory recorder costs are further decreased if used with an existing single board computer.

In certain embodiments, providing for redundancy everywhere beyond the flash memory array ensures high reliability and minimizes any risk of single point failures. Embedding local processing and memory within the FPGA optimizes both performance and latency. In some cases, the use of an optional AES encryption algorithm based on feedback results in superior data security.

Figure 9:
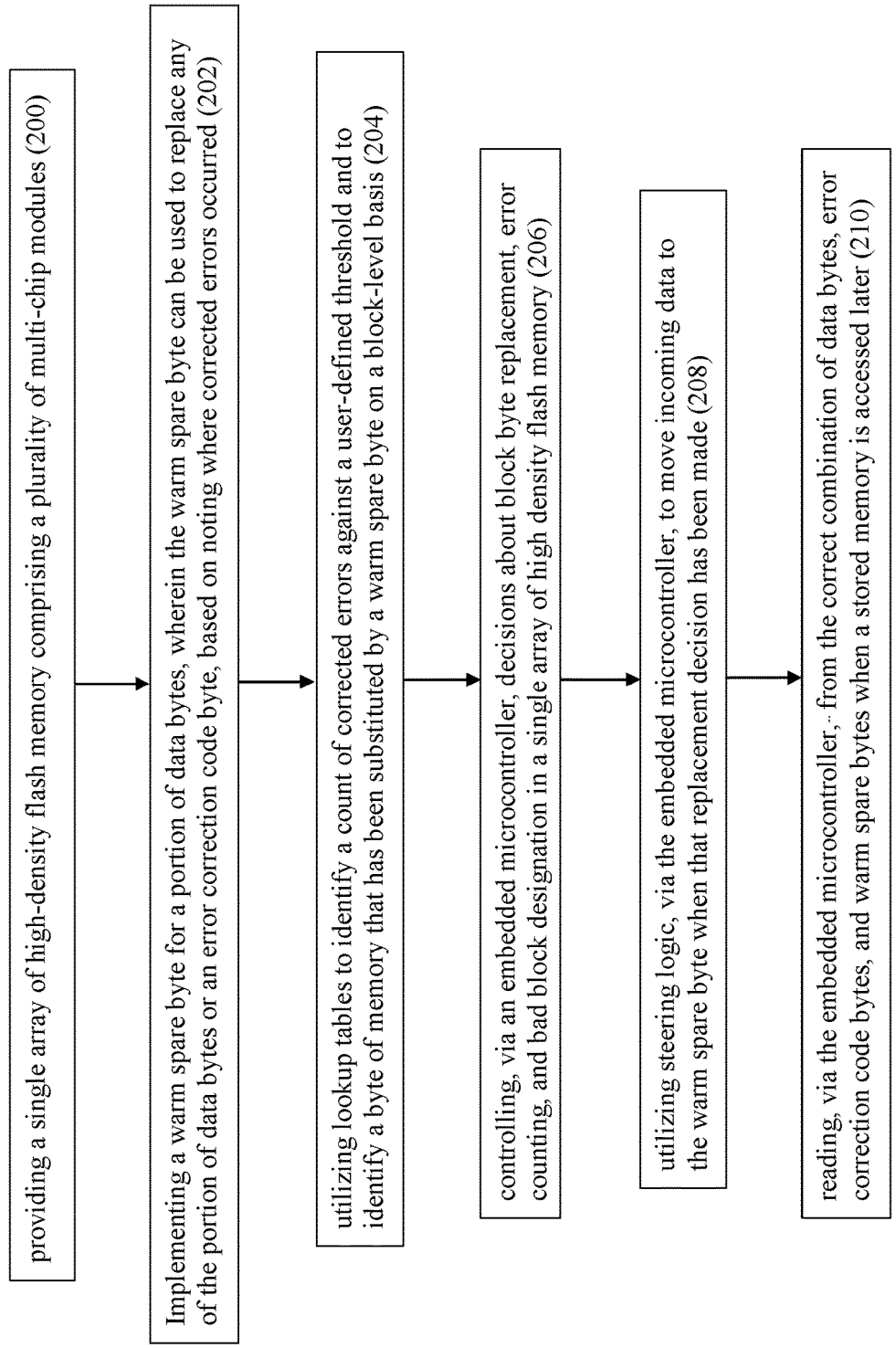
FIG. 9 shows a flowchart of one embodiment of a method of the present disclosure.

Referring to FIG. 9, a flowchart of one embodiment of a method of the present disclosure is shown. More specifically, the method being provides a single array of high-density flash memory comprising a plurality of multi-chip modules 200 followed by implementation of a warm spare byte which is one example is for every four data bytes. The number of data bytes can be 2, 4, 6, 8 . . . depending upon the desired application. The warm spare byte in this example is used to replace any of the four data bytes or an error correction code byte, based on noting where the corrected errors occurred 202. Lookup tables are used to identify a count of corrected errors against a user-defined threshold and to identify a byte of memory that has been substituted by a warm spare byte on a block-level basis 204. An embedded microcontroller controls decisions about block byte replacement, error counting, and bad block designation in a single array of high density flash memory 206. Steering logic, via the embedded microcontroller, is sued to move incoming data to the warm spare byte when that replacement decision has been made 208. The embedded microcontroller reads from the correct combination of data bytes, error correction code bytes, and warm spare bytes when a stored memory is accessed later 210. In some cases, encryption of the output ensures a secure downlink.

The computer readable medium as described herein can be a data storage device, or unit such as a magnetic disk, magneto-optical disk, an optical disk, or a flash drive. Further, it will be appreciated that the term "memory" herein is intended to include various types of suitable data storage media, whether permanent or temporary, such as transitory electronic memories, non-transitory computer-readable medium and/or computer-writable medium.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A flash memory recorder comprising:
an array of high-density flash memory comprising a plurality of multi-chip modules;
a primary processor in communication with a primary field programmable gate array comprising a primary static random-access memory module, the primary processor being configured to control operations of the array of high-density flash memory;
a primary magnetoresistant random access memory module communicating with the primary field programmable gate array and comprising a first error count lookup table and a first warm spare replacement lookup table;
wherein information from the primary magnetoresistant random access memory module is also stored on the primary static random access memory;
a redundant processor in communication with a redundant field programmable gate array comprising a redundant static random-access memory module, the redundant processor being configured to control operations of the array of high-density flash memory; and
a redundant magnetoresistant random access memory module communicating with the redundant field programmable gate array and comprising a second error count lookup table and a second warm spare replacement lookup table; and
wherein information from the redundant magnetoresistant random access memory module is also stored on the redundant static random access memory;
at least one of the primary and redundant error count lookup tables is used to determine when to replace a bad block of data in the array of high-density flash memory; and
at least one of the primary and redundant static random-access memory modules or at least one of the magnetoresistant random access memory modules, provides warm spare data to replace the bad block of data.

2. The flash memory recorder of claim 1, further comprising additional flash memory arrays with power switching per array to reduce power consumption as well as increase reliability when a particular array is not being accessed.

3. The flash memory recorder of claim 1, further comprising an encryption module utilizing AES encryption to provide a protected downlink.

4. The flash memory recorder of claim 1, further comprising an embedded microcontroller configured to control decisions about block byte replacement, error counting, and bad block designation.

5. The flash memory recorder of claim 1, further comprising single bit correction/double bit detection (SEC/DED) error correction.

6. A method of implementing a high reliability flash memory recorder, comprising:
providing an array of high-density flash memory comprising a plurality of multi-chip modules;
controlling the array of high-density flash memory using a primary processor in communication with a primary field programmable gate array comprising a primary static random-access memory module;
storing a first error count lookup table and a first warm spare replacement lookup table on a primary magnetoresistant random access memory module communicating with the primary field programmable gate array;
storing information from the primary magnetoresistant random access memory module on the primary static random access memory;
controlling the array of high-density flash memory using a redundant processor in communication with a redundant field programmable gate array comprising a redundant static random-access memory module;
storing a second error count lookup table and a second warm spare replacement lookup table on a redundant magnetoresistant random access memory module communicating with the redundant field programmable gate array;
storing information from the redundant magnetoresistant random access memory module on the redundant static random access memory;
utilizing error count lookup tables to identify a count of corrected errors against a user-defined threshold to determine when to replace a bad block of data with warm spare replacement data; and
performing a warm spare replacement of the bad block of data on a block-level basis using the warm spare replacement data from at least one of the primary and redundant static random-access memory modules or at least one of the magnetoresistant random access memory modules.

7. The method of implementing a high reliability flash memory recorder of claim 6, further comprising:
controlling, via an embedded microcontroller, decisions about block byte replacement, error counting, and bad block designation;
utilizing steering logic, via the embedded microcontroller, to move incoming data to a warm spare byte when a replacement decision has been made;
reading, via the embedded microcontroller, from a correct combination of data bytes, error correction code bytes, and warm spare bytes when a stored memory is accessed later; and
encrypting a downlink, via an encryption module using AES encryption.

8. The method of implementing a high reliability flash memory recorder of claim 6, further comprising providing additional flash memory arrays with power switching per array to reduce power consumption as well as increase reliability when a particular array is not being accessed.

9. The method of implementing a high reliability flash memory recorder of claim 6, wherein when the warm spare replacement of the bad block of data uses at least one of the primary and redundant static random-access memory modules, the primary and redundant magnetoresistant random access memory modules are updated periodically to provide a non-volatile copy of the warm spare replacement lookup table.

10. The method of implementing a high reliability flash memory recorder of claim 6, wherein the use of a spare bank of memory ensures that an original capacity of the recorder will be maintained at end of life.

11. The method of implementing a high reliability flash memory recorder of claim 6, further comprising using external radiation-hardened processors with third party file management and bad block management software for additional control of the flash memory array.

12. The method of implementing a high reliability flash memory recorder of claim 6, further comprising providing for increased data capacity efficiency with the same number of multichip modules by using a less robust redundancy and error correction capability.

13. A tangible, non-transitory, computer-readable media having instructions thereupon which, when executed by a processor, cause the processor to perform a method comprising:

controlling, via an embedded microcontroller, decisions about block byte replacement, error counting, and bad block designation;

utilizing steering logic, via the embedded microcontroller, to move incoming data to a warm spare byte when a replacement decision has been made;

reading, via the embedded microcontroller, from a correct combination of data bytes, error correction code bytes, and warm spare bytes when a stored memory is accessed later; and encrypting a downlink, via an encryption module using AES encryption.

14. The tangible, non-transitory, computer-readable media having instructions thereupon of claim 13 which, when executed by a processor, cause the processor to perform a method, the method further comprising:

providing additional flash memory arrays with power switching per array to reduce power consumption as well as increase reliability when a particular array is not being accessed.

15. The tangible, non-transitory, computer-readable media having instructions thereupon of claim 13 which, when executed by a processor, cause the processor to perform a method, wherein the single array of high-density flash memory achieves a single printed wiring board density of a multiple terabit capacity recorder.

16. The tangible, non-transitory, computer-readable media having instructions thereupon of claim 13 which, when executed by a processor, cause the processor to perform a method, wherein the use of a spare bank of memory ensures that an original capacity of the recorder will be maintained at end of life.

17. The tangible, non-transitory, computer-readable media having instructions thereupon of claim 13 which, when executed by a processor, cause the processor to perform a method, the method further comprising:

using external radiation-hardened processors with third party file management and bad block management software for additional control of the flash memory array.

18. The tangible, non-transitory, computer-readable media having instructions thereupon of claim 13 which, when executed by a processor, cause the processor to perform a method, the method further comprising:

providing for increased data capacity efficiency with the same number of multichip modules by using a less robust redundancy and error correction capability.

19. The tangible, non-transitory, computer-readable media having instructions thereupon of claim 13 which, when executed by a processor, cause the processor to perform a method, the method further comprising:

utilizing single bit correction/double bit detection (SEC/DED) error correction.

* * * * *